United States Patent [19]
Melse

[11] Patent Number: 5,933,049
[45] Date of Patent: *Aug. 3, 1999

[54] POWER-SUPPLY CIRCUIT WITH A TRANSFORMER AND AN ON/OFF SWITCH AT THE SECONDARY SIDE OF THE TRANSFORMER

[75] Inventor: Abraham L. Melse, Nijmegen, Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/710,627

[22] Filed: Sep. 20, 1996

Related U.S. Application Data

[63] Continuation of application No. 08/710,627, Sep. 20, 1996.

[30] Foreign Application Priority Data

Sep. 25, 1995 [EP] European Pat. Off. .............. 95202572

[51] Int. Cl.⁶ ................................................. H02M 3/335
[52] U.S. Cl. .......................... 327/538; 327/530; 327/540; 363/21
[58] Field of Search ..................................... 327/530, 531, 327/533, 538, 110, 540, 172; 363/21, 19; 320/140

[56] References Cited

U.S. PATENT DOCUMENTS

| | | | |
|---|---|---|---|
| 4,387,418 | 6/1983 | Koike ......................................... | 363/19 |
| 4,536,696 | 8/1985 | Ray ........................................... | 320/140 |
| 4,847,742 | 7/1989 | Ohashi et al. ............................. | 363/21 |
| 5,101,334 | 3/1992 | Plagge et al. .............................. | 363/19 |

FOREIGN PATENT DOCUMENTS 4339160  5/1995  Germany .

*Primary Examiner*—Dinh Le
*Attorney, Agent, or Firm*—Steven R. Biren

[57] ABSTRACT

A power supply circuit, particularly a flyback converter, comprises a transformer having a secondary winding that powers a load device and/or a rechargeable battery via a rectifier diode. The secondary winding is short circuited by means of a switch connected in series with a diode. The short-circuit is detected by a measurement circuit comprising a measurement winding and a comparator which compares the amplitude variation of the voltage across the measurement winding with a threshold voltage. When a short-circuit is detected a control circuit for the control of the switching transistor of the flyback converter is changed over to a mode in which a given small current is supplied, which flows almost exclusively through the switch. As soon as the short-circuit ends the flyback converter resumes its normal mode of operation. If desired, the load device can control the desired current and/or voltage for powering the load device and charging the battery by turning on and turning off the switch.

13 Claims, 3 Drawing Sheets

POWER-SUPPLY CIRCUIT WITH A TRANSFORMER AND AN ON/OFF SWITCH AT THE SECONDARY SIDE OF THE TRANSFORMER

CROSS REFERENCE TO RELATED APPLICATIONS

This is a continuation of application Ser. No. 08/710,627 filed Sep. 20, 1996.

BACKGROUND OF THE INVENTION

This invention relates to a power supply circuit comprising:
a transformer having a primary winding connected to receive a primary voltage and having a secondary winding for generating a secondary voltage; a load device and a rectifier diode connected in series across the secondary winding to supply a current to the load device; and an on/off switch for interrupting the current from the secondary winding to the load device.

Such a power supply circuit is used in portable mains-powered equipment, which may or may not comprise rechargeable batteries. The transformer provides the electrical isolation from the mains, which is required for safety reasons. Particularly in portable equipment comprising rechargeable batteries there is an increasing trend to use switched-mode power supplies instead of the customary 50/60 Hz transformer, in order to raise the efficiency and, especially, to reduce the weight of the power supply. A further development is the separation between the power supply and the actual apparatus with the batteries. There is a trend towards a "power plug", which incorporates a switched-mode power supply and the transformer and which supplies a non-hazardous electrically isolated low voltage for use in the apparatus to be coupled to the power plug. The apparatus accommodates the other power supply components including rechargeable batteries, if present. Since the apparatus itself is isolated from the mains voltage, regulations for approval are less severe or are not imposed at all. This also applies to the on/off switch of the apparatus if this switch has been included in the secondary circuit of the transformer as shown in FIG. 1, which represents a known configuration in which an on/off circuit has been included in the secondary circuit formed by the load device and the rectifier diode. The on/off switch can be a normal hand-operated switch. Alternatively, the on/off switch can be an electronic switch which, as is known from Patenschrift DE 43 39 160 C1, in addition to or instead of the control means provided in the power plug, can be switched on and off by the load device in such a rhythm, duty cycle control, that the average current is given the desired value, for example, to charge the batteries. The electronic series switch should be capable of handling large currents, particularly in apparatuses with rechargeable batteries, and dissipates power. Since the electronic switch is turned on by a control signal from the load device, the control signal will be small or absent in the case of empty batteries and the electronic series switch can no longer be turned on at the instant at which the power plug is connected to the mains voltage. Special measures must be taken to preclude this latch-up situation and this requires more electronic circuitry.

SUMMARY OF THE INVENTION

According to the invention, in order to solve the aforementioned problems, the power supply circuit of the type defined in the opening paragraph is characterized in that the on/off switch is arranged in parallel with the load device to provide a current conduction path in addition to the current conduction path of the load device, and the power supply circuit further comprises: measurement means for the comparison of the secondary voltage with a reference; and means for changing over the current intensity of the current to a predetermined comparatively small value relative to the rated value of the current in response to the comparison.

The on/off switch parallel to the load device in fact short-circuits the power supply circuit. This short-circuit causes a decrease of the secondary voltage, which decrease is detected by the measurement means. The measurement means switch the power supply to a predetermined comparatively small supply current, which keeps flowing through the on/off switch. The magnitude of the small supply current and the resistance of the on/off switch dictate the secondary voltage during short-circuiting, which voltage should differ sufficiently from the normal operating voltage of the load device when the on/off switch is open. The small current though the on/off switch is sustained as long as the power supply circuit detects a short-circuit of the secondary side, as a result of which the switch hardly dissipates power. By permanently closing the on/off switch the power supply to the load device is substantially turned off. This closing can be effected by hand or under control of the load device. When the on/off switch is turned on and off by the load device in a given rhythm a duty cycle control is obtained, causing the current supplied by the power supply circuit to vary between the predetermined small value and the rated operating value. Thus, it is possible to control, for example, the operating voltage across the load device and/or the charging current of rechargeable batteries. The load device communicates with the power supply by means of the short-circuit of the secondary voltage.

The change-over to the predetermined small current under short-circuit conditions resembles foldback in power supplies, where the output current is reduced when overloading is imminent. However, in the case of foldback the power supply is not deliberately short-circuited with an on/off switch in order to switch the power supply to a predetermined small output current, either rhythmically for duty cycle control or permanently to turn off the power supply.

Flyback converters are very suitable for the power supply circuit in accordance with the invention. To this end, an embodiment of a power supply circuit is characterized in that the transformer forms part of a flyback converter comprising a switching transistor having a main current path arranged in series with the primary winding and having a control electrode connected to receive control pulses from a control circuit having a control input for receiving a change-over signal for changing over the current intensity; the transformer further comprises a third winding for supplying a measurement voltage which is proportional to the secondary voltage; and the power supply circuit further comprises: a detector for measuring the amplitude of the measurement voltage and for supplying an amplitude signal; a reference source for supplying the reference; a comparator for comparing the amplitude signal with the reference and for generating the change-over signal in response to the comparison.

The measurement voltage across the third winding of the transformer is representative of the secondary voltage. Short-circuit of the secondary voltage results in an amplitude variation of the measurement voltage, which variation is measured and translated into a change-over signal by means of the detector, the reference source and the comparator, by means of which signal the effective current of the flyback converter is reduced, for example by reducing the frequency of the flyback converter, or by reducing the current through the switching transistor of the flyback converter, or in another manner.

The short-circuit may have an adverse effect on the load device and/or the operation of the power supply circuit. This can be precluded in that the on/off switch in series with a further diode is connected across the secondary winding. When the on/off switch is closed the rectifier diode is cut off, as a result of which the load device is isolated from the short-circuited secondary voltage. An alternative is to arrange the further diode in series with the rectifier diode and to connect the on/off switch to the node between the two diodes. Particularly in the case of a flyback converter, the further diode is important in order to prevent the secondary winding from being short-circuited in the forward interval, i.e. when the switching transistor conducts.

BRIEF DESCRIPTION OF THE DRAWINGS

These an other aspects of the invention will be described and elucidated on the basis of exemplary embodiments with reference to the accompanying drawings, in which.

In these Figures parts or elements having like functions have the same reference symbols.

DESCRIPTION OF THE PREFERRED EMBODIMENTS

Figure 1:
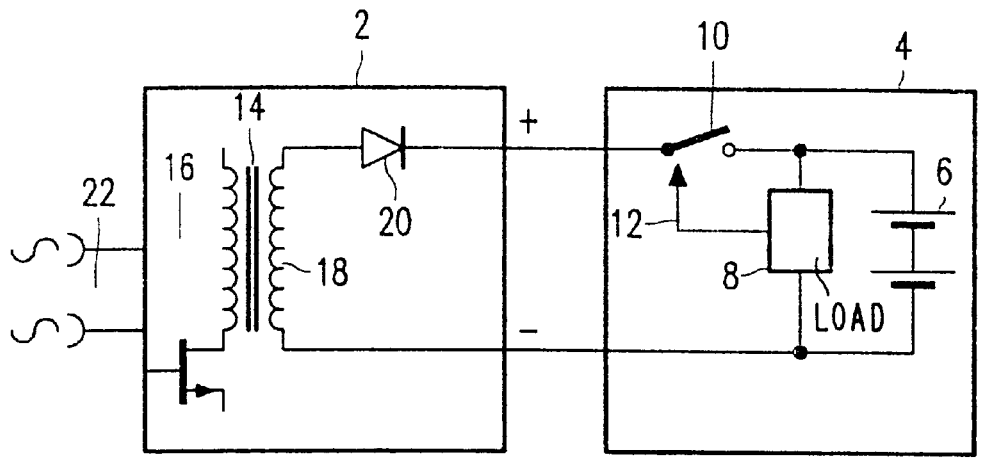
FIG. 1 is a basic diagram of a known power supply circuit.
Figure 2A:
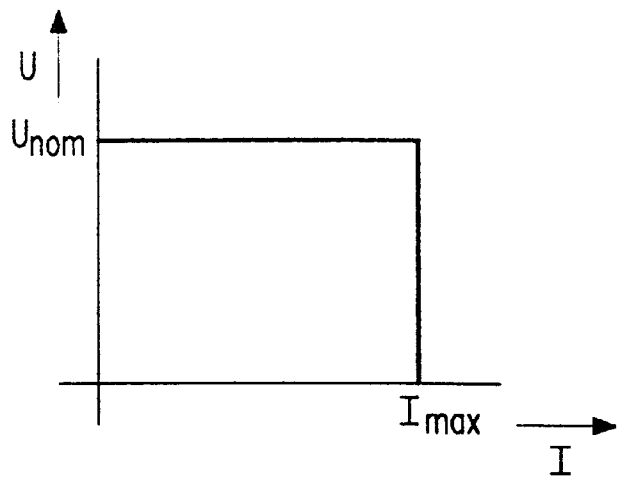
FIG. 2A shows a first current-voltage characteristic of a known power supply circuit.
Figure 2B:
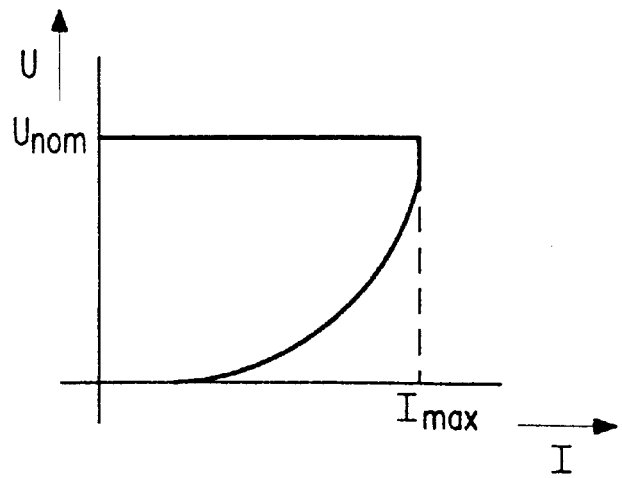
FIG. 2B shows a second current-voltage characteristic with foldback of a known power supply circuit.

FIG. 1 shows diagrammatically a customary power supply system for portable equipment, such as battery chargers, shavers, mobile radios, mobile telephones, personal audio equipment, vacuum cleaners, electric tooth-brushes, electrical knives, drills etc. Many of these apparatuses have rechargeable batteries which are charged by means of a mains voltage adapter. Some apparatuses operate on primary (non-rechargeable) batteries and on the mains via the mains voltage adapter. The mains voltage adapter, also referred to as "power plug", because the constantly decreasing dimensions of the adapter closely approximate those of a regular mains plug, supplies a non-hazardous low voltage to the apparatus to be powered. The power plug 2 can be coupled to the apparatus 4 in order to charge the battery 6 of the apparatus 4 and/or to operate the apparatus 4 continuously. The apparatus 4 includes a load device 8 powered by the power plug 2 or by the battery 6. If the apparatus 4 does not have a rechargeable battery 6 and is, for example, powered directly by the power plug 2, the load device 8 includes a smoothing capacitor instead of the battery 6. The apparatus has an on/off switch 10 for switching the power supply for the apparatus 4 on and off. The on/off switch 10 can be a hand actuated mechanical or electronic switch, which is actuated by the user of the apparatus 4 in order to turn on and turn off the apparatus 4. The on/off switch 10 may form part of a control system in which the load device 8 generates a control signal for the control input 12 of the on/off switch 10. The control signal turns the on/off switch on and off in accordance with a periodic pattern in order to control the average voltage across the load device 8 or the average current through the load device 8 or through the rechargeable battery 6 so as to obtain a desired value. FIG. 2A shows an example in which the power plug 2, in combination or not in combination with the on/off switch 10, produces a substantially constant nominal voltage $U_{nom}$ across the load device 8, the current being limited to a maximum current intensity $I_{max}$. However, constant current control is also possible, as is often the case for charging the battery 6. FIG. 2B shows another example of a current-voltage characteristic with foldback, where the output current is reduced as the load increases.

The power plug 2 comprises a transformer 14 having a primary winding 16 and a secondary winding 18, which supplies the apparatus 4 with direct voltage via a rectifier diode 20. This transformer 14 forms part of a switched-mode power supply, which converts the mains voltage 22 to a low non-hazardous direct voltage for the apparatus 4 to be powered. The formerly customary 50/60 Hz transformer has been superseded by a much smaller version, which forms part of a switched-mode power supply having a high efficiency and a small volume. Although it is possible to incorporate the mains voltage adapter as a whole in the portable apparatus, it is advantageous to separate the adapter with the transformer from the apparatus because, on the one hand, the weight and volume of the apparatus are reduced and, on the other hand, no or less stringent requirements are imposed as regards the electrical safety of the apparatus.

The average current through the on/off switch 10 can be considerable, particularly during charging of the battery 6. If the on/off switch 10 comprises a switching transistor, this transistor produces heat and gives rise to unnecessarily high losses. If the batteries have been drained so far that the actuation of the on/off switch 10 no longer functions, the power supply system will fail to start when the power plug 2 is connected. The apparatus assumes a latch-up condition and charging is not possible. This can be precluded by controlling the on/off switch 10 not only from the load device 8 but also from an additional electronic circuit in the apparatus 4, which is connected to the power plug 2 before the on/off switch 10.

Figure 3:
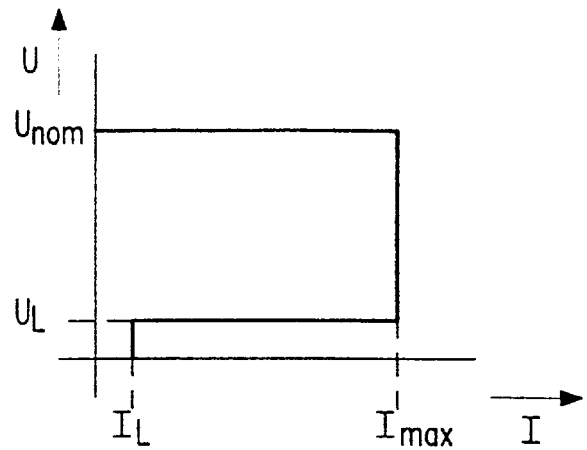
FIG. 3 shows a current-voltage characteristic of a power supply circuit in accordance with the invention.

The dissipation of the on/off switch 10 is not a problem and the additional electronic circuitry to preclude latch-up are not necessary in the power supply circuit in accordance with the invention. According to the invention, the on/off switch 10 is not used as a series switch but as a short-circuit switch which short-circuits the power plug 2. The power plug 2 is designed in such a manner that the output current of the power plug 2 is reduced to a predetermined fixed small value when a short-circuit is detected. When the short-circuit has ceased, the available current is restored to its original higher value. FIG. 3 shows the current-voltage characteristic of the power plug in accordance with the invention. As long as no short-circuit is detected the voltage across the load device is equal to a nominal operating voltage $U_{nom}$ (voltage control) or the current through the load device is equal to a nominal current $I_{max}$ (current control). However, if the power plug is short-circuited deliberately by means of the on/off switch 10, the current supplied by the power plug 2 drops to a fixed small current value $I_L$. Upon the occurrence of a short-circuit the voltage decreases and when the voltage falls below a threshold voltage $U_L$ the power plug 2 changes over to the supply of the small current $I_L$. The small current $I_L$ flows through the internal resistance of the on/off switch 10 and the voltage drop across the on/off switch 10 should therefore be smaller than or equal to the threshold voltage $U_L$. The threshold voltage $U_L$ is for example 30% of the nominal voltage $U_{nom}$. The value of the small current $I_L$ can be comparatively very small, so that hardly any dissipation occurs in the on/off switch 10 and in the power plug 2. Therefore, the on/off switch 10 can be implemented by means of a cheap low-power FET having a fairly high drain-source resistance in its conductive state.

Figure 4:
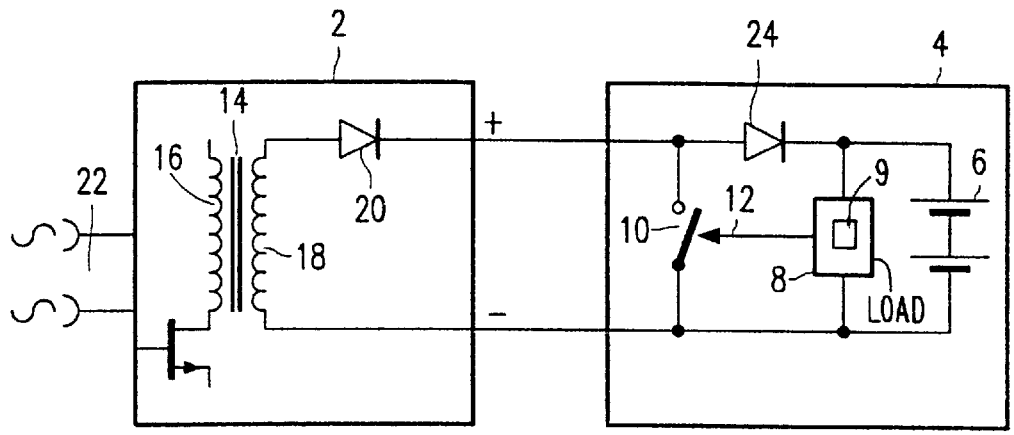
FIG. 4 shows a basic diagram of a first embodiment of a power supply circuit in accordance with the invention.

FIG. 4 shows a first embodiment. The on/off switch 10 is arranged in parallel with the load device 8 and, in order to prevent the battery 6 and the load device 8 from being short-circuited by the on/off switch 10, a second diode 24 is arranged in series with the rectifier diode 20 to isolate the load device 8 and the battery 6 from the on/off switch 10. The second diode 24 is cut off when the on/off switch 10 is closed. If desired, the on/off switch 10 can also be accommodated in the power plug 2, but this requires an additional connecting wire between the power plug 2 and the apparatus 4. As described hereinbefore, the on/off switch 10 can be activated by hand, i.e. by someone using an apparatus operated by the power supply circuit, and/or by a control signal with duty cycle control. In the case of a short-circuit only a small current $I_L$ flows through the on/off switch 10 and the diode 24 is cut off. When the on/off switch 10 is opened an operating current flows through the diodes 20 and 24 to the load device 8 and/or the battery 6. If desired, the load device 8 can modulate the duty cycle of the on/off switch 10 for example, by means of a comparison device 9 which compares the load voltage or load current with a reference voltage or reference current, respectively, for turning switch 10 on and off in response to the comparison, so as to give the operating current or the operating voltage a certain value for powering the load device 8 and/or charging the battery 6.

Figure 5:
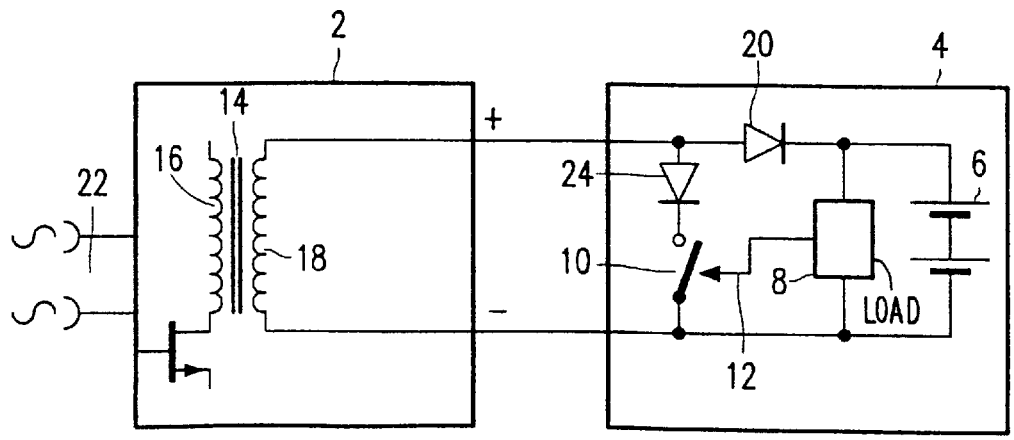
FIG. 5 shows a basic diagram of a second embodiment of a power supply circuit in accordance with the invention.

FIG. 5 shows an alternative configuration in which the rectifier diode 20 is accommodated in the apparatus 4 and the second diode 24 in series with the on/off switch 10 is connected directly across the secondary winding 18. The second diode 24 prevents the secondary winding 18 from being short-circuited during the interval in which the primary winding in the power plug 2 is connected to the rectified mains voltage via the switching transistor of the switched-mode power supply.

When the battery is fully drained, i.e. at least has a voltage below the threshold voltage $U_L$, the power plug responds to this with the small current $I_L$ in accordance with the characteristic of FIG. 3, although in fact a large charging current is desired. This situation continues until the battery 6 has accumulated so much charge that the threshold voltage $U_L$ is surpassed. The duration of this condition depends on the magnitude of the small current $I_L$ and the number of battery cells connected in series. The load device 8 can be adapted to compare a voltage across the load device or a current through the load device with a reference voltage or current so as to turn the switch 10 on and off in response to the comparison.

Figure 6:
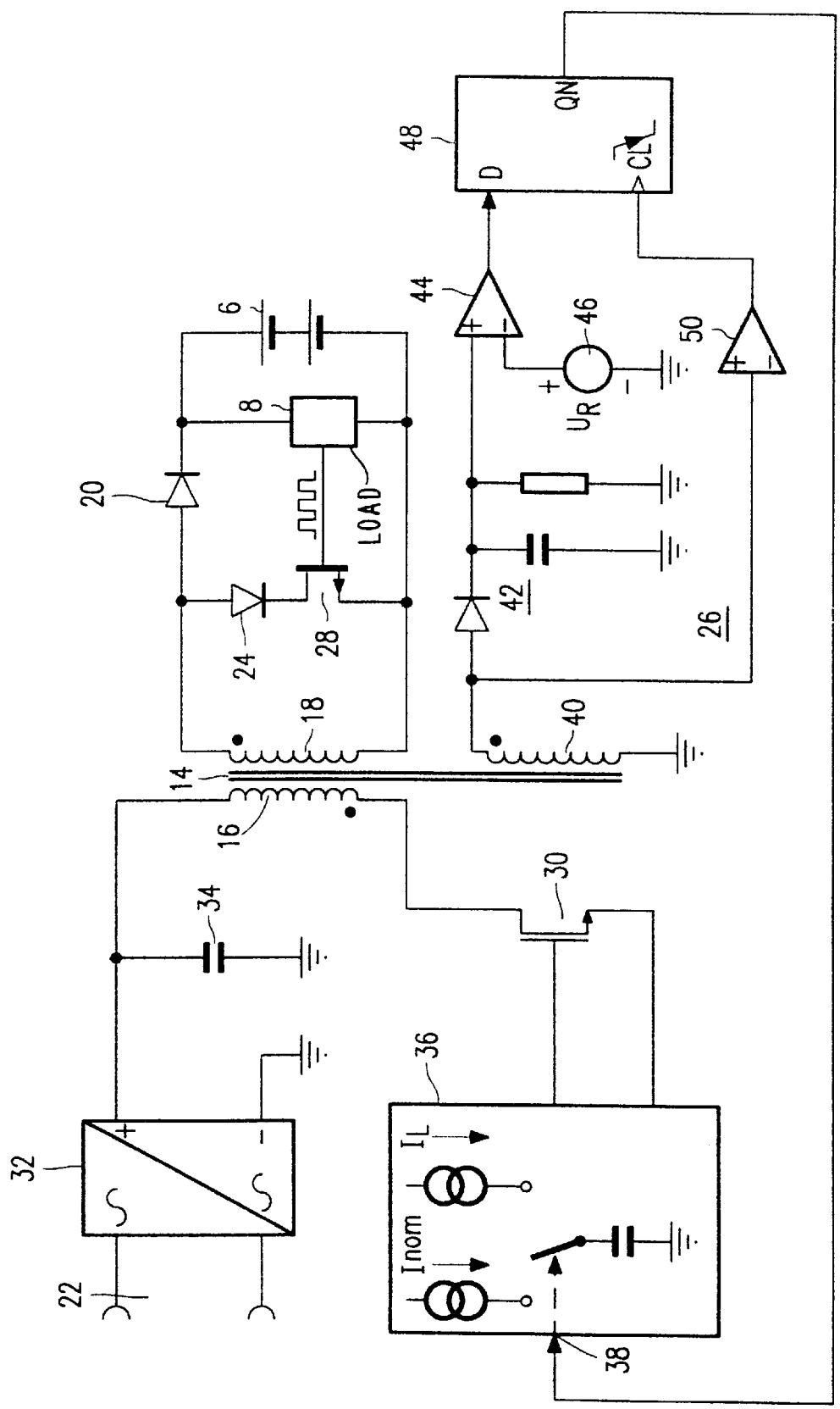
FIG. 6 shows a circuit diagram of an embodiment of a power supply circuit in accordance with the invention.

FIG. 6 shows, by way of example, a basic diagram of a power supply circuit in accordance with the invention. The circuit is a flyback converter comprising a transformer 14 provided with a measurement circuit 26 for detecting the short-circuit of the secondary voltage by the on/off switch 10, in the present case equipped with an NMOS transistor 28 whose gate is controlled from the load device 8. The primary winding 16 of the transformer 14 is connected to a direct voltage via an NMOS switching transistor 30, which direct voltage has been derived from the mains voltage 22 by means of a bridge rectifier 32 and a smoothing capacitor 34. The switching transistor 30 has its source and gate connected to a control circuit 36, which supplies control pulses to the switching transistor 30. The duration and the repetition frequency of the control pulses are determined by electronic circuits in the control circuit 36, which are known per se to those skilled in the art of flyback converters. The peak current through the switching transistor 30 can also be controlled and varied in known manner in the control circuit 36 so as to meet the fluctuating current or voltage demand of the load device 8 and/or the battery 6. The control circuit 36 has an input 38 to which a change-over signal is applied, by means of which the control of the switching transistor 30 is changed so as to reduce the average current through the switching transistor 30 to a value corresponding to the small value $I_L$ in the secondary circuit. This is possible, for example, by reducing the switching frequency of the control pulses for the gate of the switching transistor 30 by a given factor and, at the same time, fixing the peak current through the switching transistor 30.

The measurement circuit 26 comprises a third winding 40, which supplies a measurement voltage which is proportional to the voltage across the secondary winding 18. The amplitude of the measurement voltage is measured by means of a detector 42, whose time constant is small enough to track amplitude variations as a result of a short-circuit. A comparator 44 compares the value of the detected measurement voltage with a reference voltage $U_R$ from a reference voltage source 46. The output signal of the comparator 44, which indicates whether the value is greater or smaller than the reference voltage $U_R$, is connected to the data input D of a flip-flop 48. The value of the output signal of the comparator 44 is clocked in at the instant at which the sign of the measurement voltage changes when the current through the load device 8 and/or the battery 6 becomes zero. For this purpose, the measurement voltage from the third winding 40 is applied to the clock input CL of the flip-flop 48 via a comparator 50. The Q-not output (QN) of the flip-flop 48 is connected to the input 38 of the control circuit 36, which is changed over to supply the comparatively small current when a comparatively high change-over signal is received.

When the secondary winding 18 is not short-circuited by the further switching transistor, i.e. NMOS transistor 28, the flyback converter operates in the normal mode, in which the amplitude and/or the frequency of the current pulses through the primary winding 16 have been selected in such a manner that a comparatively large average current is available for the load device 8 and/or the battery 6. The amplitude of the measurement voltage across the third winding 40 is then higher than the reference voltage $U_R$ and the Q-not output (QN) of the flip-flop 48 is low.

If the battery 6 is still empty or if a load device 8 with a smoothing capacitor which is still empty is switched on, the NMOS transistor 28 not being short-circuited, the situation is in fact the same. However, the amplitude of the measurement voltage is then smaller than the reference voltage $U_R$ and the Q-not output (QN) of the flip-flop 48 is high. The power supply will then supply current pulses of comparatively small average value to the load 8 and/or the battery 6 until the reference voltage $U_R$ is exceeded.

In the case of short-circuiting by the NMOS transistor 28 the current pulses through the secondary circuit will be divided among the diodes 20 and 24, i.e. if the voltage drop across the NMOS transistor 28 is sufficiently high. However, as the current pulse decreases to zero there will be an instant at which the voltage drop across the transistor 28 is smaller than the voltage across the load 8 and/or the battery 6. The diode 20 is then cut off and the secondary voltage is chiefly determined by the product of the decreasing secondary current through the transistor 28 and the resistance of the transistor 28. The time constant of the detector 42 is selected in such a manner that at the clocking instant, i.e. when the current has become zero, the output voltage of the detector is smaller than the reference voltage. The Q-not output (QN) then goes high and the control circuit 36 changes over to the small current until the short-circuit has ceased. This allows the use of a simple and cheap transistor 28 with a fairly high internal resistance. The value of the reference voltage ($U_R$) is related to the on/off condition of the on/off switch, i.e. the condition of transistor 28. The situation as described above with a low battery voltage and/or the smoothing capacitor still empty is approached more closely as the resistance of the transistor 28 decreases.

Thus, the power supply to the load device 8 and/or the battery 6 can be turned on and turned off permanently. Obviously, it is also possible to opt for a regular hand-operated switch instead of or parallel to the transistor.

In addition to or instead of the existing control by the flyback converter the load device 8 may, if desired, provides a further control signal to continually switch the further switching transistor 28 so as to switch over between the supply of a large current and the supply of a small current with the aid of the NMOS transistor 28 in accordance with a switching pattern which depends on the demand.

Flyback converters and circuits performing the function of the control circuit 36 are known per se. A device suitable for this purpose is, inter alia, the IC TEA 1101 of Philips Semiconductors, which has an input for changing over the magnitude of the current.

I claim:

1. A power supply circuit comprising: a transformer having a primary winding connected to receive a primary voltage and having a secondary winding for generating a secondary voltage; a load device and a rectifier diode connected in series across the secondary winding to supply a current to the load device; an on/off switch for interrupting the current from the secondary winding to the load device, wherein the on/off switch is coupled in parallel with the load device to provide a current conduction path in addition to the current conduction path of the load device, measurement means for the comparison of a voltage proportional to the voltage of the secondary winding with a reference voltage ($U_R$); and means coupled to a circuit including the primary winding for changing over the current intensity of the current to a predetermined comparatively small value in response to the comparison, wherein the circuit forms a part of a flyback converter comprising a switching transistor having a main current path connected in series with the primary winding and having a control electrode connected to receive control pulses from a control circuit having a control input for receiving a change-over signal for changing over the current intensity; the transformer further comprises a third winding for supplying a measurement voltage which is proportional to the secondary voltage; and the measurement means further comprises: a detector for determining an amplitude of the measurement voltage and for supplying an amplitude signal; a reference source for supplying the reference voltage ($U_R$); a comparator for comparing the amplitude signal with the reference voltage and for generating the change-over signal in response to the comparison.

2. A power supply circuit as claimed in claim 1, wherein the power supply circuit further comprises: a flip-flop having a logic output for supplying the change-over signal, a data input for receiving an output signal from the comparator, and a clock input for receiving a binary signal which is a measure of the sign of the measurement voltage.

3. A power supply circuit as claimed in claim 1, wherein the on/off switch is connected, in series with a further diode, across the secondary winding.

4. A power supply circuit as claimed in claim 1, comprising a further diode connected in series with the rectifier diode, and the on/off switch is connected to a node between the further diode and the rectifier diode.

5. A power supply circuit as claimed in claim 1, wherein the load device is part of a load circuit that includes a rechargeable battery.

6. A power supply circuit as claimed in claim 1, wherein the load device compares a voltage across the load device with a reference voltage for turning on and turning off the on/off switch in response to the comparison.

7. A power supply circuit as claimed in claim 1, wherein the load device compares a current through the load device with a further reference for turning on and turning off the on/off switch in response to the comparison.

8. A power supply circuit as claimed in claim 1, wherein the on/off switch comprises a further switching transistor.

9. A power supply circuit as claimed in claim 1, wherein the on/off switch is connected in series with a further diode across the secondary winding.

10. A power supply circuit as claimed in claim 9, comprising a further diode connected in series with the rectifier diode, and the on/off switch is connected to a node between the further diode and the rectifier diode.

11. A power supply circuit as claimed in claim 1, comprising a further diode connected in series with the rectifier diode, and the on/off switch is connected to a node between the further diode and the rectifier diode.

12. A power supply circuit as claimed in claim 1, wherein the load device compares a voltage across the load device with a reference voltage for turning on and turning off the on/off switch in response to the comparison.

13. A power supply circuit as claimed in claim 1, wherein the load device compares a current through the load device with a further reference for turning on and turning off the on/off switch in response to the comparison.

* * * * *